United States Patent 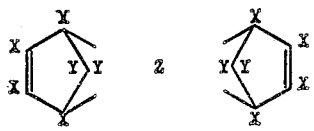

3,403,036
Patented Sept. 24, 1968

3,403,036
POLYMERS AND COATINGS RENDERED FLAME RETARDANT BY THE ADDITION OF HALOGENATED-CYCLOPENTADIENE ADDUCTS
Raymond R. Hindersinn, Lewiston, N.Y., and John F. Porter, Durham, N.C., assignors to Hooker Chemical Corporation, Niagara Falls, N.Y., a corporation of New York
No Drawing. Continuation-in-part of application Ser. No. 390,220, Aug. 17, 1964. This application Mar. 24, 1967, Ser. No. 625,594
24 Claims. (Cl. 106—18)

ABSTRACT OF THE DISCLOSURE

Polymeric materials and coatings are rendered fire retardant by incorporating therein a Diels-Alder adduct of a halogenated cyclopentadiene and a polyunsaturated cycloaliphatic compound. Typical compounds include the adducts of hexachlorocyclopentadiene with 1,5-cyclooctadiene, dicyclopentadiene, cyclopentadiene, and the like. The fire retardance of the compositions can be further enhanced by the incorporation therein of a metallic compound, particularly a compound of antimony, arsenic or bismuth. A preferred metallic compound is antimony oxide.

Cross reference to prior application

This is a continuation-in-part of copending application S.N. 390,220, filed Aug. 17, 1964, now abandoned.

This invention relates to constant or nonmigrating fire retardants for otherwise combustible organic compositions.

The use of organic compositions, particularly those grouped together in the broad class of polymeric materials and coatings, is expanding each year. These materials find wide application as wire coatings, pipes, conduits and other industrial moldings and extruded products, as well as in paints, films, coatings, and miscellaneous products. These and other uses are better served by polymeric compositions and coatings that are fire retardant or flame resistant. Many prior art attempts to impart fire retardance to such compositions by the use of additives have adversely affected the desirable properties of the polymer or coating, due to the high proportions of fire retardant additive often required to be used to achieve an adequate level of fire retardancy. In addition, prior products have often been adversely affected, due to the migratory properties and sensitivity to environmental conditions of the fire retardant additives used.

Accordingly, it is an object of this invention to provide fire retardant polymer compositions and coatings. Additionally, it is an object of this invention to provide such polymer compositions containing additives that not only impart constant fire resistance but also enhance or preserve other physical properties of the protected composition.

It has now been found that Diels-Alder adducts of halogenated cyclopentadiene, hereinafter more fully defined, having a melting point above 250 degrees centigrade, a vapor pressure of less than 0.10 millimeter of mercury at 197 degrees centigrade and a halogen content of at least 40 percent when admixed with a polymeric composition imparts to the polymeric composition an extremely constant fire retardancy.

In accordance with this invention there is provided a fire retardant polymeric composition wherein the constant fire retarding agent is a compound of the formula

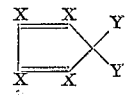

wherein X is selected from the group consisting of bromine, chlorine and fluorine, Y is selected from the group consisting of bromine, chlorine, fluorine, alkyl and alkoxy, Z is a tetravalent cyclic hydrocarbon having at least 5 carbon atoms, Z may be substituted by lower alkyl of 1 to 6 carbon atoms, chlorine, bromine or fluorine. The alkyl and alkoxy radicals mentioned generally have 1 to 10 carbon atoms and preferably are of 1 to 6 carbon atoms. Z is a cyclic hydrocarbon of 5 to 18 carbon atoms and from 1 to 5 cyclic structures. When Z is a plurality of cyclic structures, they are fused, that is, share carbon atoms.

Such a compound may be made by adducting (Diels-Alder reaction) one mole of a polyunsaturated cycloaliphatic compound and two or more moles of a polyhalogenated cyclopentadiene of the formula

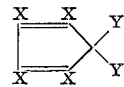

X and Y have the same definition as previously stated. The polyunsaturated cycloaliphatic compound mentioned above contains 5 to 18 carbon atoms, has 1 to 5 cyclic structures and when more than one, the cyclic structures are fused and at least two sites of carbon to carbon unsaturation which may be either ethylenic or acetylenic.

Illustrative of the polyhalogenated cyclopentadienes suitable for use in this invention are hexachlorocyclopentadiene, 5,5 - dimethoxytetrachlorocyclopentadiene, hexabromocyclopentadiene, 5,5 - difluorotetrachlorocyclopentadiene, 5,5 - dibromotetrachlorocyclopentadiene and 5,5-diethoxytetrachlorocyclopentadiene.

Satisfactory polyunsaturated aliphatic compounds for use in preparing the Diels-Alder adduct with include cycloaliphatic compounds exemplified by but not limited to methyl cyclopentadiene, cyclopentadiene, dicyclopentadiene, bicyclo(2.2.1)heptadiene, 1,5-cyclooctadiene, cyclodecadiene and cyclododecadiene.

The preparation of 1,4,7,10-dimethanocycloocta-1,2,3, 4,7,8,9,10,13,13,14,14 - dodecachloro - 1,4,4a,5,6,6a,7,10, 10a,11,12,12a - dodecahydro[1,2,5,6]dibenzene is disclosed by Ziegler and Froitzheim-Kühlhorn, Annalen, vol.

589, page 157 (1954). This compound's structure is believed to be

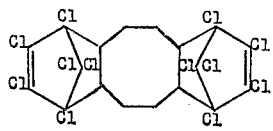

For conveinence this compound will be referred to by the short title of 1,5 COD. The adduct is prepared by condensing two moles of hexachlorocyclopentadiene with one mole of 1,5-cyclooctadiene in xylene at a temperature below 200 degrees centigrade. The adduct melts at above 350 degrees centigrade and has a vapor pressure of 0.006 millimeter of mercury at 197 degrees centigrade.

In a similar manner 1,2,3,4,6,7,8,9,13,13,14,14-dodecachloro - 1,4:5,10:6,9 - trimethano - 11H-benzo[b]fluorene is prepared by condensing two moles of hexachlorocyclopentadiene with one mole of dicyclopentadiene. The adduct has the assigned structure:

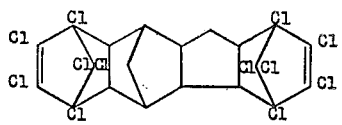

For convenience this compound will be referred to as DCP. DCP melts at about 277 degrees centigrade to 278 degrees centigrade and has a vapor pressure of 0.044 millimeter of mercury at 197 degrees centigrade.

Likewise 1,2,3,4,5,6,7,8,10,10,11,11 - dodecachloro - 1, 4:5,8-dimethanofluorene is prepared by condensing two moles of hexachlorocyclopentadiene with one mole of cyclopentadiene. This adduct has the assigned structure

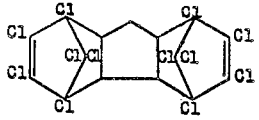

For convenience this adduct will be referred to as CP. CP melts at about 319 degrees centigrade to 322 degrees centigrade and has a vapor pressure of 0.031 millimeter of mercury at 197 degrees centigrade.

The adduct 1,2,3,4,5,6,7,8,12,12,13,13 - dodecachloro-1,4:5,8:9,10-trimethano-anthracene is prepared by condensing one mole of the Diels-Alder adduct of cyclopentadiene and acetylene with two moles of hexachlorocyclopentadiene. The resulting adduct has the assigned structure:

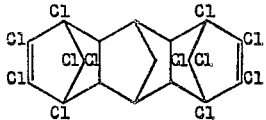

For conveinence this aduct will be referred to as BCH. BCH melts at about 340 degrees centigrade and has a vapor pressure of 0.008 millimeter of mercury at 197 degrees centigrade.

The fire retardant additives of this invention remain in the protected polymeric composition even after prolonged exposure of the plastic article to high temperatures. From 0.3 to 4 percent of retardant are lost or transferred when a standard polypropylene sample (55 percent polymer, 30 percent additive) is heated at 120 degrees centigrade for seven days as compared to twenty-five fold greater loss for many more conventional fire retardants. The polymeric compositions and coatings of this invention include high molecular weight polymers and resins as well as the intermediate molecular weight materials utilized for coatings and paints. The polymers embraced within the scope of this invention include the homopolymers and copolymers of unsaturated aliphatic, alicyclic, and aromatic hydrocarbons. Suitable monomers are ethylene, propylene, butene, pentene, hexene, heptene, octene, 2-methylpropene-1, 3-methylbutene-1, 4-methylpentene-1, 4-methylhexene-1, 5-methylhexene-1, bicyclo-(2.2.1)-2-heptene, butadiene, pentadiene, hexadiene, isoprene, 2,3-dimethylbutadiene-1,3, 2-methylpentadiene-1,3, 4-vinylcyclohexene, vinylcyclohexene, cyclopentadiene, styrene and methylstyrene, and the like.

Two of the polymers of this group, polyethylene and polystyrene, have long been known in the art. Low-density (0.92 grams/cc.) polyethylene may be produced by the polymerization of ethylene at a pressure greater than twelve hundred atmospheres and at a temperature of one hundred to three hundred degrees centigrade. Lower pressures of about five hundred atmospheres can be used if a catalyst such as oxygen or benzoyl peroxide is added to the ethylene as described by Fawcett et al., Chemical Abstracts, 32, 1362 (1938).

Polystyrene is readily produced by mass, solution or emulsion polymerization as described in The Technology of Plastics and Resins, Mason, J. P. and Manning, J. F., Van Nostrand Company (1945). The polymerization is promoted by the action of light and catalysts such as hydrogen peroxide, benzoyl peroxide and other organic peroxides. Suitable solvents for solution polymerization are toluene, xylene and chlorobenzene.

In recent years a new field of linear and stereoregular polymers has become available which are suitable for use in this invention. Polymers such as polypropylene are produced with organometallic catalysts and supported metal oxide catalysts as disclosed in great detail in Linear and Steroregular Addition Polymers: Polymerization With Controlled Propagation, Gaylord, N. G. and Mark, H. F., Interscience Publishers, Inc. (1959). Monomers of the type disclosed hereinbefore are readily polymerized to solid polymers in the presence of a catalyst system comprising aluminum triethyl and titanium tetrachloride or titanium trichloride. The reaction is carried out in the presence of an inert hydrocarbon diluent, suitably purified of catalyst poisons, at a temperature in the range of fifty to two hundred and thirty degrees centigrade. At the conclusion of the reaction, the polymer can be recovered from the resulting solution or suspension by evaporation of the diluent, whereupon the polymer is treated for removal of catalyst residues, for example, by washing with water or alcohol and acids. Metal oxide catalysts, such as chromium oxide supported on silica or alumina, are suitable for polymerizing 1-olefins containing a maximum of eight carbon atoms, with no branching closer to the double bond than the 4-position. Such polymerization may be carried out in the manner described for the organometallic catalyst system.

Other polymers in addition to the above-described olefin polymers that are useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins and paint vehicles, such as bodied linseed oil; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer; polyformaldehyde; polyphenylene oxide; polymers of diallyl phthalates and phthalates; polycarbonates of phosgene or thiophosgene and dihydroxy compounds such as bisphenols, phosgene, thermoplastic polymers of bisphenols and epichlorohydrin (trade named Phenoxy polymers); graft copolymers and polymers of unsaturated hydrocarbons and an unsaturated monomer, such as graft copolymers of polybutadiene, styrene and acrylonitrile, commonly called ABS resins; ABS-polyvinyl chloride polymers, recently introduced under the trade name of Cycovin; and acrylic polyvinyl chloride polymers, known by the trade name of Kydex 100.

The polymers of the invention can be in various physical forms, such as shaped articles, for example, moldings, sheets, rods, and the like; fibers, coatings, films and fabrics, and the like.

The halogenated Diels-Alder adducts in the present compositions are desirably incorporated in the polymeric materials in an effective fire retardant amount. Generally, halogenated Diels-Alder adducts in the amount of from about 2 to about 50 percent by weight of the polymeric composition and desirably from about 5 to about 40 percent by weight of the polymeric composition and preferably from about 10 to 35 percent by weight are mixed with polymeric composition. Improved fire retardance can be provided by incorporating metallic compounds, wherein the metal is selected from the group consisting of antimony, arsenic and bismuth, in the polymeric compositions in the amount of about 1 to about 30 percent by weight of said polymeric composition, preferably about 2 to 25 percent.

Antimony oxide is the antimony compound that is presently preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonius acids and their pentavalent derivatives. It is convenient to use sodium antimonite or potassium antimonite when it is desired to use an alkali metal salt of the antimony for compositions of this invention. U.S. Patent 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnate, antimony anisate, and their pentavalent dihalide derivatives. Likewise, the esters of antimonius acids and their pentavalent derivatives disclosed in U.S. Patent 2,993,924 such as tris(n-octyl) antimonite, tris(2-ethylhexyl) antimonite, tribenzyl antimonite, tris(beta-chloroethyl) antimonite, tris(beta-chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed in particular the oxides of arsenic and bismuth.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer, e.g., from 70 to 600 degrees centigrade. Alternatively, the additives and polymer are dry-blended in the finely-divided state so that an intimate mixture is obtained upon subsequent molding or extrusion.

The invention is illustrated by the following examples, which are not intended to limit the scope of the invention. Unless otherwise stated, all parts are by weight and all temperatures in degrees centigrade. In these examples, the properties of the molded polymer compositions were tested in accordance with standard American Society for Testing Materials (ASTM) test procedure ASTM D 635–56T unless otherwise noted. In this test, a specimen can fall into one of three categories: (1) Burning (the rate is reported), (2) Self-extinguishing upon removal of flame and (3) Non-burning. In these examples, the length of time the specimens burned after the flame was removed is reported. Usually a range for several specimens is given.

Example 1.—Polypropylene control

A sample of polypropylene prepared by organometal catalyzed polymerization of propylene was heated in the roller head of a Brabender Plastograph for five minutes at two hundred to two hundred and five degrees centigrade, and then was discharged into a compression mold. The compression molded specimen burned at a rate of 1.3 inches per minute.

Example 2

Using the procedure of Example 1, 55 parts of polypropylene, 15 parts of antimony oxide and 30 parts of the adduct 1,5-COD were blended and compression molded into bars. The specimens were self-extinguishing in 3.1, 1.2 and 1.7 seconds. The test sample did not drip during the test.

Example 3

Nylon 6,6 made from caprolactam, was ground to pass through a 20 mesh sieve (sieve opening 0.0328 inch). Seventy parts of the ground nylon were blended with 10 parts of antimony oxide and 20 parts of the indicated adduct. The resulting compositions were molded into pencil-shaped bars, 7 millimeters in diameter and 4 inches long and were tested for fire retardancy.

Fire retardant:      Self-extinguishing time (seconds)
    None (control) _____ 45+, 45+, 45+
    1,5 COD _____ 1.0, 1.6, 1.3
    DCP _____ 1.8, 1.8, 4.0

Similar results were obtained when other antimony compounds are used in place of antimony oxide in the compositions of Example 3.

Example 4

Polyethylene compositions were prepared and were tested in a manner similar to that of Example 3.

| Type Fire Retardant | Parts | | | Self-extinguishing time (seconds) |
|---|---|---|---|---|
| | Retardant | Polyethylene [1] | $Sb_2O_3$ | |
| None | None | 100 | None | Burns. |
| 1,5 COD | 30 | 55 | 15 | 0.5, 1.5, 0.2. |
| DCP | 25.0 | 62.5 | 12.5 | 2.7. |
| 1,5 COD | 40 | 40 | 20 | 0.5, 0.8, 0.6. |
| 1,5 COD | 25.0 | 62.5 | 12.5 | 9, 7, 8. |

[1] Low density, Alathon 5B.

Example 5

Polystyrene, general purpose, specific gravity 1.04–107 (Lustrex, High Flow 77) compositions were prepared and tested in a manner similar to Example 3.

| Type Fire Retardant | Parts | | | Self-extinguishing time (seconds) |
|---|---|---|---|---|
| | Retardant | Polystyrene | Sb$_2$O$_3$ | |
| None | None | 100 | None | Burns. |
| 1,5 COD | 20 | 70 | 10 | 13. |
| DCP | 20 | 70 | 10 | 0.8, 0.3, 0.6. |

Example 6

Additional polypropylene compositions were prepared, molded into pencil-bars, weighed and subjected to a temperature of 120 degrees centigrade for up to 7 days. At intervals, the specimens were reweighed to determine amount of loss of fire retardant due to migration when heated. Each specimen except the control (100 percent polypropylene) contained 55 parts polypropylene (general purpose, Avisun 1014), 15 parts antimony oxide and 30 parts of specified adduct.

| Days at 120 degrees | Percent Weight Loss (Total Composition) | | |
|---|---|---|---|
| | 1 | 4 | 7 |
| Fire Retardant: | | | |
| Control | 0.3 | 0.4 | 0.5 |
| 1,5 COD | 0.1 | 0.2 | 0.3 |
| DCP | 0.2 | 0.3 | 0.4 |
| CP | 0.2 | 0.3 | 0.4 |
| BCH | | 0.3 | 0.3 |
| Pentachlorotoluene | | 21.9 | 26.4 |
| Pentachlorobenzyl Chloride | | 28.5 | 29.7 |

Example 7

Polypropylene compositions were prepared and were tested in a manner similar to that of Example 3.

| Type Fire Retardant | Parts | | | Self-extinguishing time (seconds) |
|---|---|---|---|---|
| | Retardant | Polypropylene [1] | Sb$_2$O$_3$ | |
| BCH | 30 | 55 | 15 | 0.8, 0.4, 1.0. |
| DCP | 30 | 55 | 15 | 2.2, 1.0, 2.6. |

[1] General purpose, Avisun 1014.

Similar results are obtained when the metallic compound is an arsenic oxide.

Example 8

A thermoplastic phenoxy resin, specific gravity 1.182 (Phenoxy 8, PRDA–8060) was molded into rods 4 inches long having a diameter of 7 millimeters. These rods were ignited and then continued to burn for more than 45 seconds with dripping. Additional rods were prepared containing 70 parts of the same phenoxy resin and 30 parts of 1,5 COD. These rods were ignited and were self-extinguishing in 4.3, 2.8 and 4.7 seconds.

Example 9

A polyester resin (a polypropylene glycol maleate admixed with styrene) to which was added 1 percent by weight of benzoyl peroxide was molded into rods cured 16 hours at 120 degrees centigrade. The rods were ignited and continued to burn for more than 45 seconds. Additional rods were prepared containing 100 parts of the above polyester resin, 40 parts 1,5 COD, 5 parts antimony oxide and 1 part benzoyl peroxide. The rods were ignited and self-extinguishing in less than 1 second.

Example 10

A polycarbonate polymer (Lexan 105) was compared in this example. Each composition was molded into test rods, ignited and burning characteristics noted.

Composition A (control) polycarbonate only, average self-extinguishing time—5 seconds. Composition B—70 parts polycarbonate and 30 parts 1,5 COD, self-extinguishing time—less than 1 second.

Example 11

A diallyl phthalate prepolymer (Dapon 35) was compared in this example. Each composition was molded into test bars of ½ inch wide by ½ inch high by 5 inches long at a temperature of 149 degrees for 6 minutes. The compositions were tested in accordance with ASTM Method D–229 by inserting the bar into a heater coil maintained at about 460 degrees centigrade until 15 seconds after the same was ignited. The ignition time and self-extinguishing time of each sample was recorded.

| Composition | A (control) | B |
|---|---|---|
| Formulation: | | |
| Diallyl phthalate | 45.0 | 45.0 |
| Aluminum silicate | 14.0 | 14.0 |
| Calcium stearate | 0.8 | 0.8 |
| Tert-butyl perbenzoate | 2.0 | 2.0 |
| Inert filler | 38.2 | 38.2 |
| 1,5 COD | None | 3.7 |
| Antimony oxide | None | 1.0 |
| | 100.0 | 100.0 |
| Test Values: | | |
| Ignition time, seconds, average | 97 | 107 |
| Burning time, seconds, average | 392 | 88 |

Example 12

A paint having a linseed oil vehicle was compared in this example. Flame tests are carried out on ¼ inch thick by 8 inches wide by 12 inches long yellow poplar panels using the method specified in ASTM Procedure D–1360–58, "Fire Retardancy of Paints," Method C.

PAINTS WITH CONSTANT FIRE RETARDANTS

| Composition | A (control) [1] | B | C |
|---|---|---|---|
| Pigments: | | | |
| Titanium Dioxide | 200 | 200 | 200 |
| Zinc Oxide, 35% Leaded | 401 | 220 | 220 |
| Magnesium Silicate | 251 | 70 | 70 |
| 1,5 COD | None | 362 | None |
| BCH | None | None | 362 |
| Vehicle: | | | |
| Bodied Linseed Oil (Z–2 viscosity) | 142.4 | 202.4 | 202.4 |
| Raw Linseed Oil | 230.3 | 328.5 | 328.5 |
| Mineral Spirits | 153 | 79.3 | 79.3 |
| Lead Naphthenate | 6.2 | 8.9 | 8.9 |
| Manganese Naphthenate | 1.9 | 2.7 | 2.7 |
| Total | 1,385.8 | 1,473.8 | 1,473.8 |
| Pigment Volume Concentration (P.V.C.) | 32.0 | 32.0 | 32.0 |
| Flame Test | (2) | (3) | (3) |

[1] National Flaxseed Processors Assn., NFPA Exterior Formulation No. 2, September 1958.
[2] Burns.
[3] Self-extinguishing.

In a similar manner, other coatings and lacquers are fire retardant by inclusion of the constant fire retardants of this invention.

It is also within the scope of the invention to use other heat stabilizers such as basic lead phosphite, basic lead carbonate and the like. Likewise, other additives in amounts from 5 to 200 percent of the polymer such as carbon black, colored pigments and dyes, and fillers such as glass fibers, powder and beads, asbestos, talc and other mineral fillers, and wood flour and other vegetable fillers, and the like, can be utilized to modify physical properties of the polymer, e.g., specific gravity, tensile strength, without departing from the spirit of the invention.

Example 13

A composition was prepared by dry blending 60 parts by weight of polypropylene, 13 parts by weight of antimony trioxide and 27 parts by weight of 1,4,7,10-dimethanocycloocta - 1,2,3,4,7,8,9,10,13,13,14,14 - dodecachloro-1,4,4a,5,6,6a,7,10,10a,11,12,12a - dodecahydro[1,2,5,6]dibenzene, which had been prepared by adducting two moles of hexachlorocyclopentadiene per mole of 1,5-cyclooctadiene. The composition was extruded at 325 degrees Fahrenheit and injection molded at 400 degrees Fahrenheit to form test specimens. The test specimens were subjected to a series of mechanical, electrical and thermal tests, the results of which are shown in Table I in comparison with the properties of a polypropylene specimen.

TABLE I

| Property | A.S.T.M. Test | Polypropylene Control | Composition of Example 13 |
|---|---|---|---|
| Thermal Aging, wt. percent loss in 42.7 days at 120° C | | 0.633 | 0.558 |
| Water Absorption, wt. percent gain in 27.9 days at 25° C | D-570 | 0.040 | 0.033 |
| Heat Distortion Temperature, ° C.: | | | |
| 66 p.s.i | D-648 | 97 | 117 |
| 264 p.s.i | D-648 | 62 | 74 |
| Notched Izod Impact, ft.-lbs./inch notch | D-256 | 0.9-1.0 | 0.4-0.7 |
| Hardness: | | | |
| Shore D | D-1706 | 75 | 76 |
| Rockwell R | D-785 | 98 | 96 |
| Flexural Strength, p.s.i | D-790 | 8,795 | 7,500 |
| Flexural Modulus, p.s.i.×10⁵ | D-790 | 2.75 | 3.9 |
| Tensile Yield Strength, p.s.i | D-638 | 5,350 | 4,000 |
| Flammability, flame out time, seconds | D-635 | (¹) | 2 |
| Thermal Stability at Elevated Molding Conditions | | | (²) |
| Dielectric Strength, s/t, v/mil | D-149 | 500 | 540 |
| Arc Resistance, seconds | D-495 | | 4 |
| Volume Resistivity, ohm-cm | D-257 | >2.5×10¹⁴ | >2.5×10¹⁴ |
| Surface Resistivity, ohm-cm | D-257 | >2.5×10¹⁴ | >2.5×10¹⁴ |
| Dielectric Constant, 10⁶ cycles | D-150 | 2.3 | 2.5 |

¹ Burning.   ² Trace of streaking at 500° F.

Example 14

Compositions A and B were prepared by dry-blending 1,5 COD with a commercial graft copolymer of polybutadiene, styrene and acrylonitrile designated by the tradename Cycolac H. Composition A was prepared using 60 parts by weight of the polymer and 40 parts by weight 1,5 COD. Composition B was prepared using 75 parts by weight of the polymer, 20 parts by weight of 1,5 COD and 5 parts by weight of antimony trioxide. Test specimens were molded of compositions A and B, and were subjected to ASTM test D-648 for the determination of the heat distortion temperature of the specimens, as well as of a control specimen of polymer with no additives. The heat distortion temperatures were found to be 85° C. for composition A, 80° C. for composition B and 74° C. for the polymer control specimen, indicating that the addition of the 1,5 COD improved the heat distortion temperatures for the polymer compositions. Test specimens of the compositions were also subjected to ASTM test D-635 for the determination of fire retardance. Compositions A and B were found to be "non-burning," whereas the polymer control specimen burned.

Examples 15 and 16

The procedure of Example 14 was repeated to prepare polymer compositions wherein the polymer was an epoxy resin of epichlorohydrin and bis(4-hydroxyphenyl) propane in Example 15, and a commercial, general purpose polystyrene in Example 16. Compositions A and B were prepared for these polymers using the same proportions and additives as in Example 14, and test specimens were prepared and tested as in Example 14. The following results were obtained:

| Example | Polymer | Heat Distortion Temp. ° C. | | | Fire Retardance | | |
|---|---|---|---|---|---|---|---|
| | | Control | Comp. A | Comp. B | Control | Comp. A | Comp. B |
| 15 | Epoxy Resin | 116 | 128 | 129 | Burning | NB | NB |
| 16 | Polystyrene | 79 | 87 | 86 | do | SE | SE |

SE = self extinguishing.   NB = non-burning.

Examples 17 and 18

Polypropylene compositions were prepared which contained the adduct CP in Example 17 and the adduct DCP in Example 18. In preparing these compositions, 26.7 parts by weight of the adduct and 13.3 parts by weight of antimony trioxide were blended with 60 parts by weight of polypropylene. Test specimens were molded of the polymer compositions and the specimens were subjected to ASTM test D-648 for the determination of the heat distortion temperature of the specimens, as well as of a control specimen of polypropylene with no additives. The heat distortion temperatures were found to be 69° C. for the composition of Example 17 containing the adduct CP, 61° C. for the composition of Example 18 containing the adduct DCP, and 58° C. for the control specimen.

From the examples it is evident that the incorporation of the fire retardant compounds of this invention into polymers imparts fire retardance to the polymer by slowing the burning rate in all cases, and by rendering the polymers self-extinguishing at the higher concentrations. The fire retardant characteristics of the compositions are further enhanced by also incorporating an antimony compound therein.

It was unexpected to find that the incorporation of the materials of the instant invention into polymers enhanced their thermal properties, as exemplified by improved heat distortion temperatures, whereas it would normally be expected that such characteristics would be adversely affected. Additionally, it was found that the compositions of the invention have less tendency to drip when contacted by a flame, thereby further reducing the hazard of using hydrocarbon polymers in industrial applications where the spreading of burning molten material can be a serious problem in the event of a fire.

Various changes and modifications may be made in the method and compositions of the invention, certain preferred forms of which have been herein described, without departing from the spirit and scope of the invention.

We claim:

1. A fire retardant polymeric composition comprising a polymer and an effective fire retardant proportion of a compound of the formula:

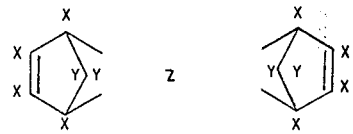

wherein X is selected from the group consisting of bromine, chlorine, and fluorine, Y is selected from the group consisting of bromine, chlorine, fluorine, alkyl and alkoxy, and Z is a tetravalent cycloaliphatic hydrocarbon radical having at least 5 carbon atoms; and wherein said polymer is selected from the group consisting of a polymer of an unsaturated hydrocarbon, a polyester, a polycarbonate, a polyamide polymer, a thermoplastic polymer of a bisphenol and epichlorohydrin, a diallyl phthalate resin and an epoxy resin.

2. The composition of claim 1 wherein the compound of the formula is 1,4,7,10-dimethanocycloocta-1,2,3,4,7,8,9,10,13,13,14,14 - dodecachloro - 1,4,4a,5,6,6a,7,10,10a,11,12,12a-dodecahydro-[1,2,5,6]dibenzine.

3. The composition of claim 1 wherein the compound of the formula is 1,2,3,4,6,7,8,9,13,13,14,14-dodecachloro-1,4:5,10:6,9-trimethano-11H-benzo[b]fluorene.

4. The composition of claim 1 wherein the compound of the formula is 1,2,3,4,5,6,7,8,12,12,13,13-dodecachloro-1,4:5,8:9,10-trimethanoanthracene.

5. The composition of claim 1 wherein the compound of the formula is 1,2,3,4,5,6,7,8,10,10,11,11-dodecachloro-1,4:5,8-dimethanofluorene.

6. The composition of claim 1 wherein the compound of the formula is present in sufficient proportion, up to about 50 weight percent of the polymer composition, to improve the fire retardancy of the polymer composition.

7. A molded article of the composition of claim 1.

8. The composition of claim 1 wherein the polymer is a homopolymer or copolymer of an unsaturated hydrocarbon.

9. The composition of claim 1 wherein the polymer is a polyester.

10. The composition of claim 1 wherein the polymer is a polycarbonate.

11. The composition of claim 1 wherein the polymer is a diallyl phthalate resin.

12. The composition of claim 1 wherein the polymer is a polyamide polymer.

13. The composition of claim 1 wherein the polymer is a thermoplastic polymer of a bisphenol and epichlorohydrin.

14. The composition of claim 1 wherein the polymer is an epoxy resin.

15. A fire retardant polymeric composition comprising a polymer, an effective fire retardant proportion of a fire retardant compound of the formula:

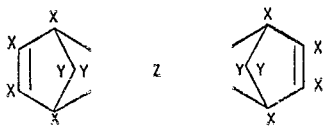

and a metallic compound wherein the metal is selected from the group consisting of antimony, arsenic and bismuth; wherein X is selected from the group consisting of bromine, chlorine, and fluorine, Y is selected from the group consisting of bromine, fluorine, chlorine, alkyl and alkoxy, and Z is a tetravalent cycloaliphatic hydrocarbon radical having at least 5 carbon atoms; and wherein said polymer is selected from the group consisting of a polymer of an unsaturated hydrocarbon, a polyester, a polycarbonate, a polyamide polymer, a thermoplastic polymer of a bisphenol and epichlorohydrin, a diallyl phthalate resin and an epoxy resin.

16. The polymer composition of claim 15 wherein the compound of the formula is present in a proportion from 2 to 50 percent by weight of the polymer composition, and the metallic compound is an antimony compound present in a proportion from 1 to 30 percent by weight of the polymer composition.

17. The composition of claim 16 wherein the antimony compound is antimony oxide.

18. A fire retardant polymeric composition comprising a polymer and an effective fire retardant proportion of a fire retardant compound which is a Diels-Alder adduct of:

wherein X is selected from the group consisting of bromine, chlorine, and fluorine, Y is selected from the group consisting of bromine, chlorine, fluorine, alkyl and alkoxy, and a polyunsaturated cycloaliphatic compound, said adduct having a melting point of at least 250 degrees centigrade and a vapor pressure of less than 0.1 millimeter of mercury at 197 degrees centigrade; and wherein said polymer is selected from the group consisting of a polymer of an unsaturated hydrocarbon, a polyester, a polycarbonate, a polyamide polymer, a thermoplastic polymer of a bisphenol and epichlorohydrin, a diallyl phthalate resin and an epoxy resin.

19. A fire retardant coating composition comprising a normally combustible, linseed oil-based coating composition and an effective fire retardant proportion of a compound of the formula:

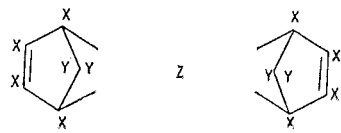

wherein X is selected from the group consisting of bromine, chlorine, and fluorine, Y is selected from the group consisting of bromine, chlorine, fluorine, alkyl and alkoxy and Z is a tetravalent cycloaliphatic hydrocarbon radical having at least 5 carbon atoms.

20. The composition of claim 8 wherein the polymer is polypropylene.

21. The composition of claim 8 wherein the polymer is polyethylene.

22. The composition of claim 8 wherein the polymer is polystyrene.

23. The composition of claim 8 wherein the polymer is a graft copolymer of polybutadiene, styrene and acrylonitrile.

24. The composition of claim 12 wherein the polymer is a long chain synthetic polymeric amide containing recurring carbonamide groups as an integral part of the main polymer chain.

References Cited

UNITED STATES PATENTS

| | | | |
|---|---|---|---|
| 2,576,666 | 11/1951 | Bluestone et al. | 260—648 |
| 2,606,910 | 8/1952 | Herzfeld et al. | 260—648 |
| 2,635,977 | 4/1953 | Lidov | 260—648 |
| 2,951,099 | 8/1960 | Hoch | 260—648 |
| 2,967,842 | 11/1961 | Roberts | 260—33.8 |
| 3,158,588 | 11/1964 | Johnson | 260—45.75 |

OTHER REFERENCES

Ziegler et al., Annalen der Chemie, 1954, vol. 589, pp. 157–162: Call No. QD1.L 7.

DONALD E. CZAJA, *Primary Examiner.*

H. S. COCKERAM, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,403,036 September 24, 1968

Raymond R. Hindersinn et al.

It is certified that error appears in the above identified patent and that said Letters Patent are hereby corrected as shown below:

Column 10, line 59, "dibenzine" should read -- dibenzene --.

Signed and sealed this 7th day of April 1970.

(SEAL)
Attest:

Edward M. Fletcher, Jr.

Attesting Officer

WILLIAM E. SCHUYLER, JR.

Commissioner of Patents